(12) United States Patent
Stockbower (10) Patent No.: US 7,297,255 B2
(45) Date of Patent: Nov. 20, 2007

(54) MASS OR ENERGY TRANSFER CARTRIDGE AND MODULE

(75) Inventor: David Stockbower, Woburn, MA (US)

(73) Assignee: Entegris, Inc., Chaska, MN (US)

( * ) Notice: Subject to any disclaimer, the term of this patent is extended or adjusted under 35 U.S.C. 154(b) by 197 days.

(21) Appl. No.: 10/889,322

(22) Filed: Jul. 12, 2004

(65) Prior Publication Data

US 2005/0000885 A1    Jan. 6, 2005

Related U.S. Application Data (63) Continuation-in-part of application No. PCT/US03/04165, filed on Feb. 11, 2003.

(60) Provisional application No. 60/435,650, filed on Dec. 20, 2002, provisional application No. 60/368,279, filed on Mar. 28, 2002.

(51) Int. Cl.
    *B01D 35/30* (2006.01)

(52) U.S. Cl. .................. 210/175; 210/232; 210/321.77; 210/321.79; 210/443; 210/433.1; 210/451; 165/158; 96/6; 96/8

(58) Field of Classification Search ................ 210/232, 210/321.86, 435, 440, 443, 44, 451, 452, 210/455, 493.1, 493.2, 497.01, 444, 321.69, 210/321.77, 321.78, 321.8, 321.87, 321.89, 210/433.1, 175; 165/158, 162; 96/6, 8
See application file for complete search history.

(56) References Cited

U.S. PATENT DOCUMENTS

| | | | |
|---|---|---|---|
| 3,118,836 A | 1/1964 | Briggs | |
| 3,399,776 A | 9/1968 | Knuth | |
| 3,460,680 A | 8/1969 | Domnick | |
| 3,696,933 A | 10/1972 | Pall et al. | |
| 3,850,813 A * | 11/1974 | Pall et al. | 210/232 |
| 4,028,254 A | 6/1977 | Shufflebarger et al. | |
| 4,172,798 A | 10/1979 | Kronsbein | |
| 4,316,801 A | 2/1982 | Cooper | |
| 4,645,601 A | 2/1987 | Regunathan et al. | |
| 4,678,576 A | 7/1987 | Leoncavallo | |
| 4,719,012 A | 1/1988 | Groezinger et al. | |
| 4,735,716 A | 4/1988 | Petrucci et al. | |
| 4,876,005 A | 10/1989 | America | |
| 4,929,354 A * | 5/1990 | Meyering et al. | 210/321.61 |
| 4,948,505 A | 8/1990 | Petrucci et al. | |
| 5,035,797 A | 7/1991 | Janik | |

(Continued)

FOREIGN PATENT DOCUMENTS

EP    364299    4/1990

(Continued)

OTHER PUBLICATIONS

U.S. Appl. No. 10/889,330, filed Jul. 2004, Stockbower.

(Continued)

*Primary Examiner*—Matthew O. Savage
(74) *Attorney, Agent, or Firm*—John E. Pillion; Timothy J. King (57) ABSTRACT

A mass transfer or energy transfer module is provided which includes a manifold, a cartridge and a bowl which houses the cartridge. The cartridge and bowl are connected to each other at least two flanges which fit into slots of the bowl to form a unitary construction.

5 Claims, 10 Drawing Sheets

U.S. PATENT DOCUMENTS

| | | |
|---|---|---|
| 5,089,131 A | 2/1992 | Gentry |
| 5,114,572 A | 5/1992 | Hunter et al. |
| 5,133,858 A | 7/1992 | Walz et al. |
| 5,354,464 A | 10/1994 | Slovak |
| 5,548,893 A | 8/1996 | Koelfgen |
| 5,549,821 A | 8/1996 | Bounnankhom et al. |
| 5,556,542 A | 9/1996 | Berman et al. |
| 5,591,329 A | 1/1997 | Davidson |
| 5,595,651 A | 1/1997 | Pavel |
| 5,609,757 A | 3/1997 | Schiavo et al. |
| 5,679,251 A | 10/1997 | Swanson et al. |
| 5,753,107 A | 5/1998 | Magnusson et al. |
| 5,826,854 A | 10/1998 | Janvrin |
| 5,837,137 A | 11/1998 | Janik |
| 6,006,924 A | 12/1999 | Sandford |
| 6,533,933 B1 | 3/2003 | Stankowski |
| 6,635,175 B2 | 10/2003 | Stankowski |
| 7,101,479 B2 | 9/2006 | Stockbower |
| 7,169,302 B2 * | 1/2007 | Stockbower ................ 210/232 |
| 2001/0037969 A1 * | 11/2001 | Stankowski ................ 210/348 |
| 2002/0014452 A1 | 2/2002 | Janik |
| 2002/0046969 A1 | 4/2002 | Bartsch et al. |

FOREIGN PATENT DOCUMENTS

| | | |
|---|---|---|
| EP | 0 657 201 A1 | 6/1995 |
| SU | 583810 | 1/1978 |
| SU | 605626 | 5/1978 |
| SU | 755291 | 8/1980 |
| SU | 528108 | 10/1996 |
| WO | WO 00/21640 | 4/2000 |
| WO | WO 01/26777 | 4/2001 |
| WO | WO 03/002228 | 1/2003 |
| WO | WO 03/002229 | 1/2003 |
| WO | WO 03/082434 | 10/2003 |
| WO | WO 03/082435 | 10/2003 |

OTHER PUBLICATIONS

U.S. Appl. No. 11/476,890, filed Jun. 2006, Stockbower.

* cited by examiner

MASS OR ENERGY TRANSFER CARTRIDGE AND MODULE

REFERENCE TO RELATED APPLICATIONS

This application is a continuation-in-part of PCT application Ser. No. PCT/US03/04165 filed Feb. 11, 2003 which, in turns, claims the benefit of provisional application Ser. No. 60/435,650 filed Dec. 20, 2002 which, in turn, claims the benefit of provisional application Ser. No. 60/368,279 filed Mar. 28, 2002.

BACKGROUND OF THE INVENTION

The present invention relates to mass transfer or energy transfer modules that are sanitary and are easy to replace and install. More particularly, the present invention relates to a mass transfer or energy transfer module formed from a mass transfer or energy transfer cartridge, a reusable bowl, a reusable manifold, and a reusable connecting device to connect the mass transfer or energy transfer cartridge, reusable bowl and manifold together.

A variety of modules are utilized to effect mass transfer or energy transfer between two fluids. Representative modules include a degasser where one fluid comprises a liquid containing a gas while the other fluid is a gas at subatmospheric pressure wherein the two fluids are separated by a gas permeable membrane. Another such module is a gasification device wherein one fluid is a gas at superatmospheric pressure and the second fluid is a liquid in which the gas is soluble wherein the fluids are separated by a gas permeable membrane. A third module is a heat exchanger wherein a hot fluid and a cool fluid are separated by a nonpermeable heat conducting material. The mass transfer or energy transfer module can comprise a manifold, a bowl for housing one fluid and a cartridge for housing a second fluid. Thus, when constructing the mass transfer or energy transfer module, the cartridge and the bowl are separately secured to and sealed to the manifold head. In addition, upon completion of mass transfer or energy transfer, the bowl and cartridge are separately removed from the head. This separate removal requires that the bowl be moved a distance substantially greater than the entire length of the cartridge thereby exposing the cartridge to permit its removal. Thereafter, the exposed cartridge is removed by hand or with a hand tool. Since the bowl must be moved the length of the cartridge, the space within which the bowl and cartridge are positioned must accommodate this removal step.

It has been proposed in U.S. Pat. No. 5,114,572, to provide a filter assembly which cooperates with a bowl to produce a filter cartridge-bowl construction which can be demounted as a single unit from a manifold. This filter assembly is not used for mass transfer or energy transfer between two fluids. It is used to filter a fluid. The filter cartridge is connected to the bowl by bayonet connections on the cartridge which fit into grooves within the interior surface of the bowl. The bayonet connections are formed integrally with the cartridge such as by being molded as a single unit. When the cartridge is so-configured, it can only be used with a bowl configured to accept the bayonet. This is undesirable since it prevents the so-configured cartridge to be used with presently produced bowls configured to not accept this cartridge. This, in turn, severely reduces the market for the so-configured cartridge. In addition, the bayonet connections are positioned below the top surface of the cartridge so that they fit into grooves in the bowl also positioned below the top surface of the cartridge. When the bayonets are so-positioned, positioning in the grooves is made more difficult by the reduced visibility.

Accordingly, it would be desirable to provide a mass transfer or energy transfer medium or cartridge which permits its use in a plurality of bowls of different configurations. In addition, it would be desirable to provide such a cartridge which includes a connection means between the cartridge and a bowl with means that are not movable relative to the cartridge during mass transfer or energy transfer utilizing two fluids. In addition, it would be desirable to provide such a cartridge having a connection means which are clearly visible so that connection of the cartridge to the bowl is facilitated. Such a cartridge would promote ease of inserting the filter cartridge into the bowl, and would reduce the space required to install the mass transfer or energy transfer module.

SUMMARY OF THE INVENTION

In accordance with this invention, a mass transfer or energy transfer module is provided comprising a manifold, and the combination of a mass transfer or energy transfer cartridge and bowl wherein the cartridge and bowl are locked together to be installed and removed as one piece from the manifold. The cartridge comprises a mass transfer or energy transfer medium sealed at both ends with an end cap. One of the end caps includes at least two flanges and a fluid passageway for fluid communication between the manifold and the interior of the cartridge. The flanges extend outwardly from the end cap and beyond an outside vertical surface of the mass transfer or energy transfer medium. The flanges are designed to fit into slots in the bowl thereby to effect connection of the cartridge to the bowl. The flanges on the end cap which secure the cartridge to the bowl permit the cartridge and bowl to be removed as one piece from the manifold. The end cap can be bonded to an end of a cartridge of any construction so that the cartridge can be secured to a bowl. In another aspect of this invention, a bowl is provided which has a collar having at least two slots which accommodate the flanges of the end cap. The bowl and collar can be unitary construction or can be formed from two separate pieces which can be joined such as with screw threads.

BRIEF DESCRIPTION OF THE DRAWINGS

FIGS. 2, 2a, and 2b are a cross sectional views of alternative modules of this invention including a cartridge top of this invention.

DESCRIPTION OF SPECIFIC EMBODIMENTS

The present invention provides a mass transfer or energy transfer cartridge and a mass transfer or energy transfer module formed of a manifold, the mass transfer or energy transfer cartridge and a bowl. The manifold provides fluid pathways for a first fluid feed into the cartridge, optional first fluid removal from the cartridge and a second fluid feed and a second fluid removal from the bowl. Fluid removal from either the cartridge or the bowl is effected through the manifold. Fluid feed can be introduced into the cartridge through the manifold either from the outside of the cartridge or from within the interior of the cartridge. In any event, sealing is provided to prevent admixture of the first fluid and the second fluid without mass or energy passing through the cartridge.

The mass transfer or energy transfer cartridge and bowl are constructed so that they are sealed with the manifold or removed from contact with the manifold as one piece. The cartridge is sealed with two end caps, at least one of which is provided with a fluid passageway. One of the end caps has a fluid passageway and at least two flanges formed integrally therewith. The fluid passageway can function as an inlet or outlet of the cartridge. The flanges are configured to effect locking of the cartridge to the top portion of the bowl. Since the flanges are positioned above the mass transfer or energy transfer medium, the cartridge can be secured to the top portion of the bowl having a larger diameter than the body of the bowl fluid blockage by the flange is less than that when the flanges are positioned between the cartridge and the body of the bowl. Subsequent to a use of the cartridge, the bowl and cartridge are removed from the manifold as a single piece rather than two pieces. Since the bowl and cartridge are removed together, the cartridge need not be removed from the manifold in a separate step. Thus, a space substantially equal to the sum of the length of the cartridge and the length of the bowl together need not be provided to remove the mass transfer or energy transfer cartridge from the manifold. Only a space as long as substantially the length of the bowl need not be provided. This permits one to install a mass transfer or energy transfer of this invention within a smaller space as compared to the space required with present mass transfer or energy transfer modules. In addition, since the cartridge is removed with the bowl, it need not be handled by a worker either by hand or with a hand tool. This substantially reduces the possibility of contacting fluid within the bowl with a worker. The bowl optionally can contain a drain for removing fluid before removal.

Figure 1:
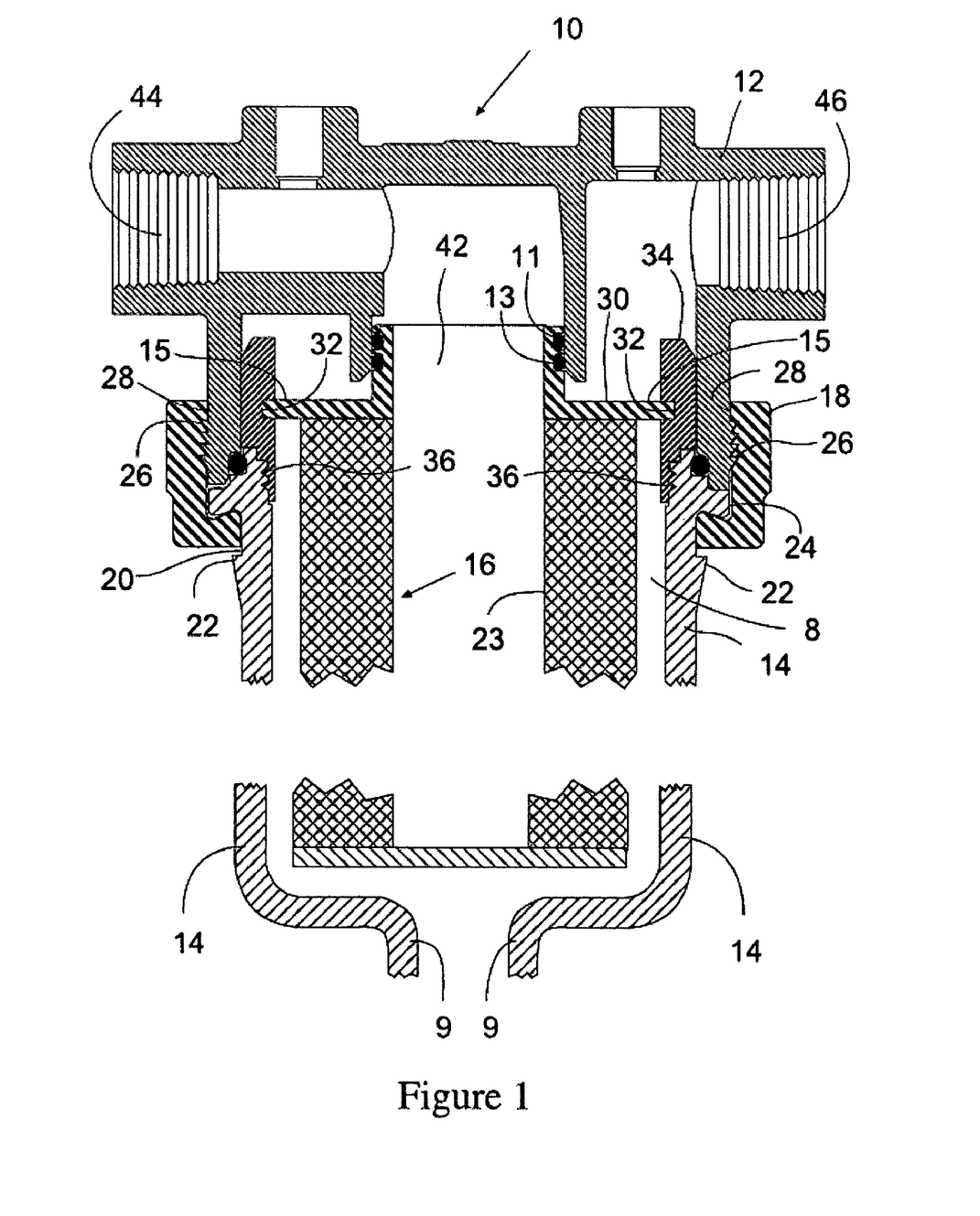
FIG. 1 is a cross sectional view of a mass transfer or energy transfer module of this invention.

Referring to FIG. 1, a mass transfer module 10 comprises a manifold 12, a bowl 14 having an inlet 9 and a mass transfer cartridge 16. Mass transfer cartridge 16 can be a membrane such as a pleated membrane which is gas permeable. Such a mass transfer cartridge can be used as a degasser for liquids or as a gas contactor for effecting dissolution of a gas in a liquid. Suitable membranes are formed from poly (tetrafluoroethylene-co-perfluoro (alkylvinyl ether)) (PFA) or poly (tetrafluoralethylene-co-hexafluoropropylene (FEP) such as disclosed in U.S. Pat. No. 4,990,294 which is incorporated herein by reference. Such membranes are useful to remove dissolved gases from liquids, "degassing" or to add a gaseous substance to a liquid. For example, ozone is added to very pure water used to wash semiconductor wafers. A threaded ring 18 is positioned on the outside surface 20 of bowl 14 and is retained thereon by bead 22 which extends around the circumference of the bowl 14 and lip 24. By controlling the size and flexibility of bead 22, the ring 18 can be slipped over the bead 18 to position the ring 18 or the bead 22 can be formed on the bowl 14 after the ring 18 is positioned as shown.

The ring 18 is substantially fixed in its position relative to the bowl 14, i.e., it cannot move any substantial distance along the length of the bowl 14. When its threads 26 and 28 are drawn together, the ring 18 carries or drives the cartridge 16 into affirmative contact with manifold 12 to effect sealing with O-rings 11 and 13. Conversely, when the ring 18 is rotated so as to drive the threads 26 and 28 apart, the cartridge 16 is positively carried or driven away from the manifold 12. Sealing of the bowl 14 to the abutting manifold 12 is effected by O-rings 11 and 13. The bowl is moved into contact with the manifold 12 vertically without rotating the bowl 14.

The cartridge 16 is connected to bowl 14 by flanges 15 on end cap 30 which mate with slots 32 in collar 34. The collar 34 is threaded into bowl 14 by threads 36. The collar 34 extends about the entire inner circumference of bowl 14. Alternatively, the bowl and collar can be formed of one piece in the shape of bowl 14 and the collar 34 such as by molding. End cap 30 including fluid passageway 42 is sealed to manifold 12 by O-rings 11 and 13. The fluid passageway 42 sealed to the end cap 30 provides fluid communication to an open interior 23 within the elongated medium of the cartridge 16. Since flanges 15 do not extend about the entire circumference of the end cap 30, fluid is capable of bypassing the end cap 30 to flow into or from the manifold 12. When module 10 is utilized as a degasser, a vacuum is drawn at inlet 44 and the liquid to be degassed in introduced through inlet 9 and is removed through passageways 8 and outlet 46. When module 10 is used to introduce gas into a liquid, superatmospheric gas enters inlet 44 and liquid enters inlet 9 and is removed though outlet 46. The structure of the collar 34 will be more fully described with reference to FIG. 3.

Figure 2:
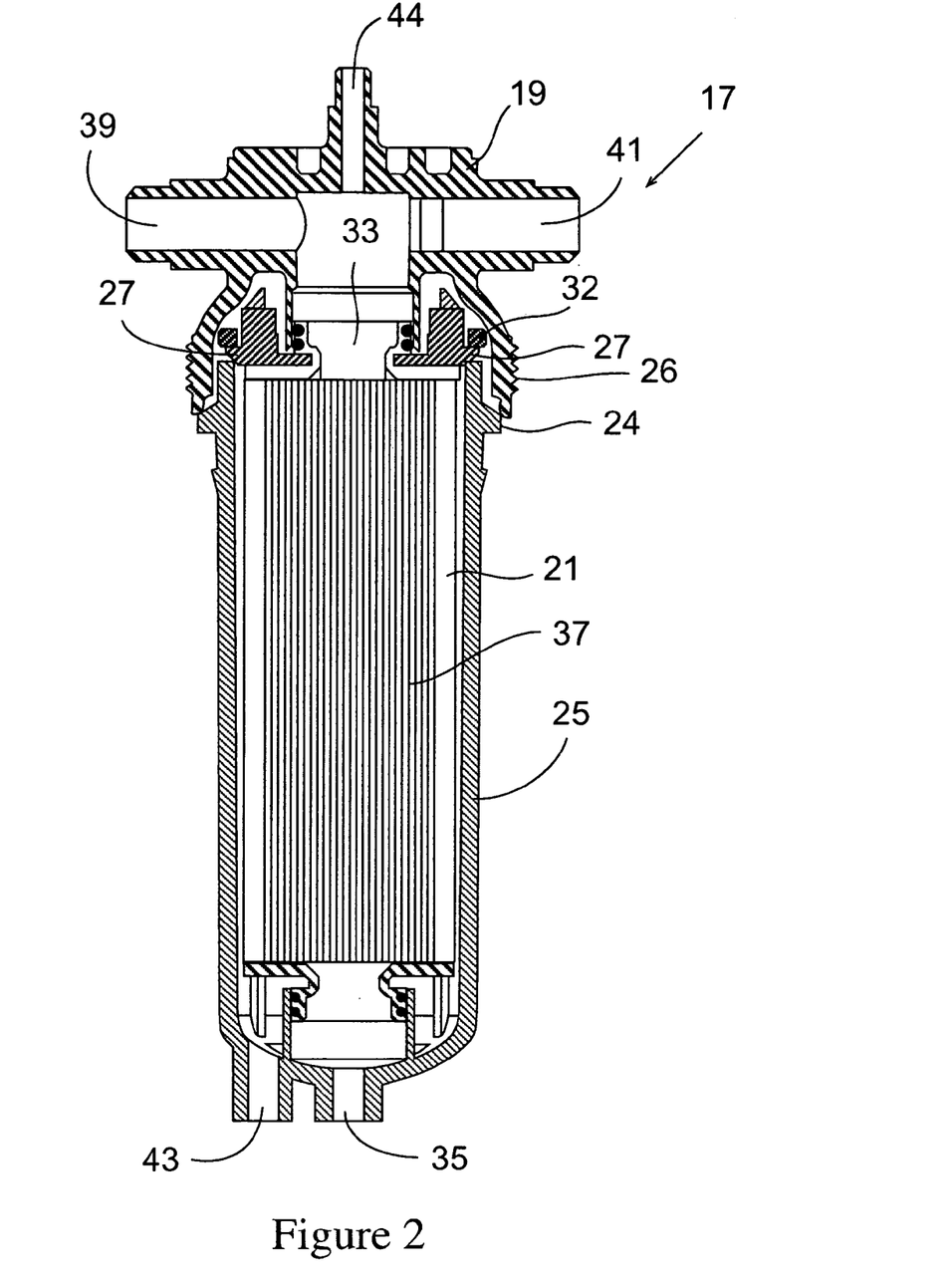

Referring to FIG. 2, module 17 includes a manifold 19, a cartridge 21 and a bowl 25. The cartridge 21 is connected to bowl 25 by flanges 27 with collar 32 on bowl 25. The cartridge 21 has a first end 21a and a second end 21b. The first end 21a of the cartridge 21 is sealed to an end cap 15a having fluid passageway 33. The second end 21b of the cartridge 21 is sealed to an end cap 15b having a fluid passageway 33b. Passageway 33 is connected to inlet 35. Passageway 33 is connected to the lumens of a plurality of hollow fibers 37 made from a nonporous heat conductive material such as stainless steel or from a chemically compatible polymer. A first fluid can be introduced through inlet 35 into hollow fibers 37 and then out of cartridge 21, through outlet 39. A second fluid can be introduced through inlet 41 onto the outside surfaces of hollow fibers 37 and then through outlet 43. The module 17 of FIG. 2 can be utilized to effect heat exchange between two fluids. The thread 26 and lip 24 function to interact with a rotatable ring (FIG. 1) in the same manner as described above for FIG. 1. An optional gas vent 44 can be provided.

Embodiments of the invention include a mass transfer or energy transfer cartridge which comprises an elongated medium capable of effecting mass transfer therethrough or for effecting energy transfer from a first fluid to a second fluid. Embodiments are illustrated in FIG. 2, FIG. 2a, and FIG. 2b. For example as shown in FIG. 2a, the elongated medium 37a has a first end 21a and a second end 21b, a first sealing plate 15a sealed to the first end 21a, a second sealing plate 15b having a fluid passageway 33b sealed to the second end, a fluid passageway 33 sealed to the first sealing plate 15a to provide fluid communication to an open interior 23 within the medium 37a, and the first sealing plate 15a having at least two flanges 27 which extend beyond an outer surface 23b of the medium 37a. In the embodiment illustrated in FIG. 2a the medium is a pleated membrane 37a. In the embodiment illustrated in FIG. 2b the medium comprises a plurality of porous hollow fiber membranes 37b. As shown in FIG. 2b, the elongated medium 37b has a first end 21a and a second end 21b, a first sealing plate 15a sealed to the first end 21a, a second sealing plate 15b having a fluid passageway 33b sealed to the second end, a fluid passageway 33 sealed to the first sealing plate 15a to provide fluid communication to an open interior 23 within the hollow fiber medium 37b, and the first sealing plate 15a having at least two flanges 27 which extend beyond an outer surface 23b of the medium 37b. In the embodiment illustrated in FIG. 2 the medium comprises a plurality of nonporous hollow fibers 37 formed of a heat conducting material. Another embodiment of the invention is a module 17 which comprises a manifold 19, the elongated medium 37, and a bowl 25 which houses the medium, and means for locking the bowl to the manifold, the at least two flanges 27 being fit into slots in said bowl to effect connection of said flanges 27 and said bowl 25. In another embodiment the bowl 25 and the collar 32 comprises a unitary construction. In another embodiment the first end cap 15a includes at least one vertical extension, each of the at least one vertical extension being fit into a vertical slot in the collar.

Figure 3:
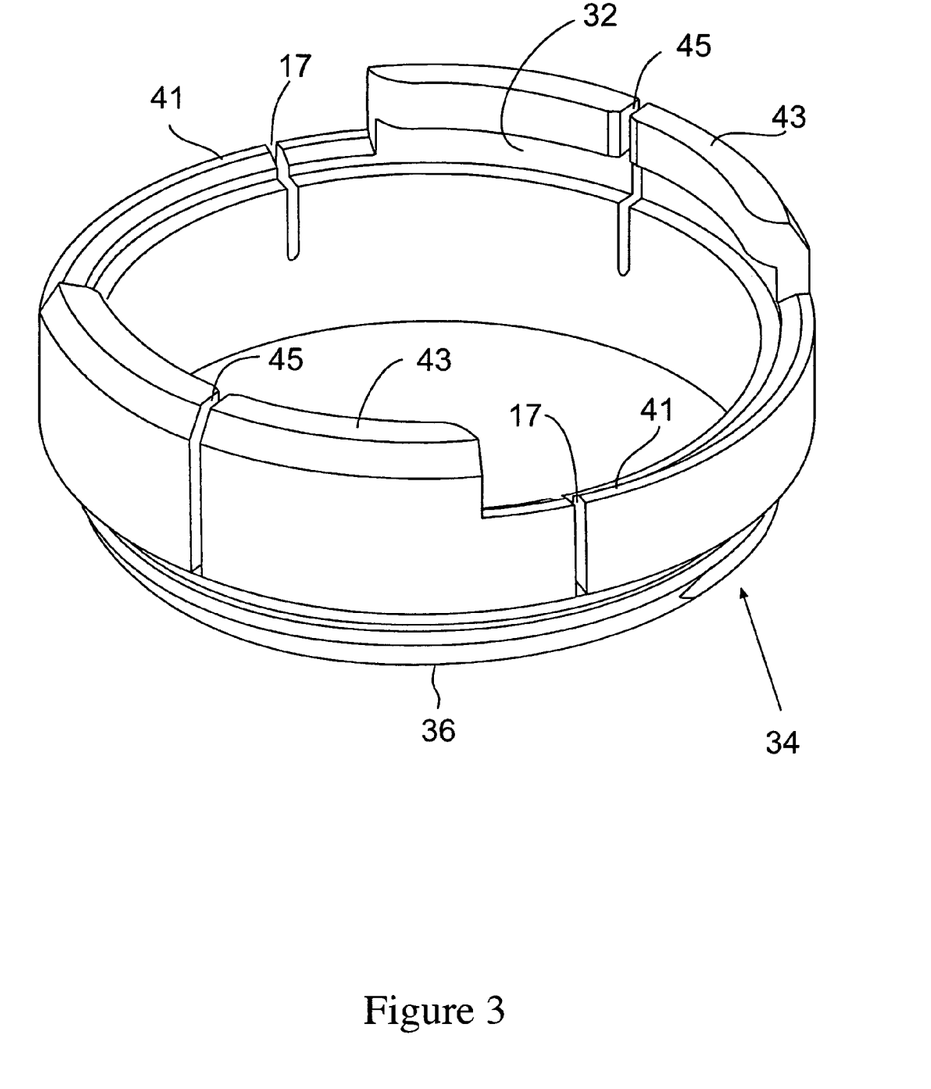
FIG. 3 is an isometric view of a collar used in conjunction with the cartridge of FIG. 2.

Referring to FIG. 3, the collar 34 includes two cutouts 41 and two vertical extensions 43. Each vertical extension 43 includes a slot 32 (one not shown). The slots 32 fit with and accommodate flanges 15. (FIG. 1) The angle subtended by slots 32 depend upon the flexibility of the material used to make end cap 30 and collar 34. The slots 32 subtend an angle of at least about 15 degrees, preferably between about 30 and about 45 degrees when the end cap 30 and collar 34 are made of relatively flexible polymer if perfluoro(alkylvinyl ether) (PFA). When the end cap 30 and collar 34 are made of relatively rigid polymer material such as polypropylene, these angles can be about one-half that for PFA. This angle size with these exemplary materials provides a desired contact surface between the flanges 15 and the slots 32 so that the end cap 30 is not separated from the collar 34 during use of the module 10. The collar 34 optionally includes detents 45 which fit with and accommodate optional vertical extension on the outside surface of flange 15. The collar 34 also includes optional vertical slots 17 which permit drainage of fluid between the collar 34 and the manifold 12.

The embodiment of FIG. 2 is inserted into the collar of FIG. 3 by aligning the flanges 15 with cutouts 41. The end cap 30 and filter cartridge 16 are then rotated so that flanges 15 fit into slots 32 thereby securing the cartridge 16 to the collar 34.

Figure 4:
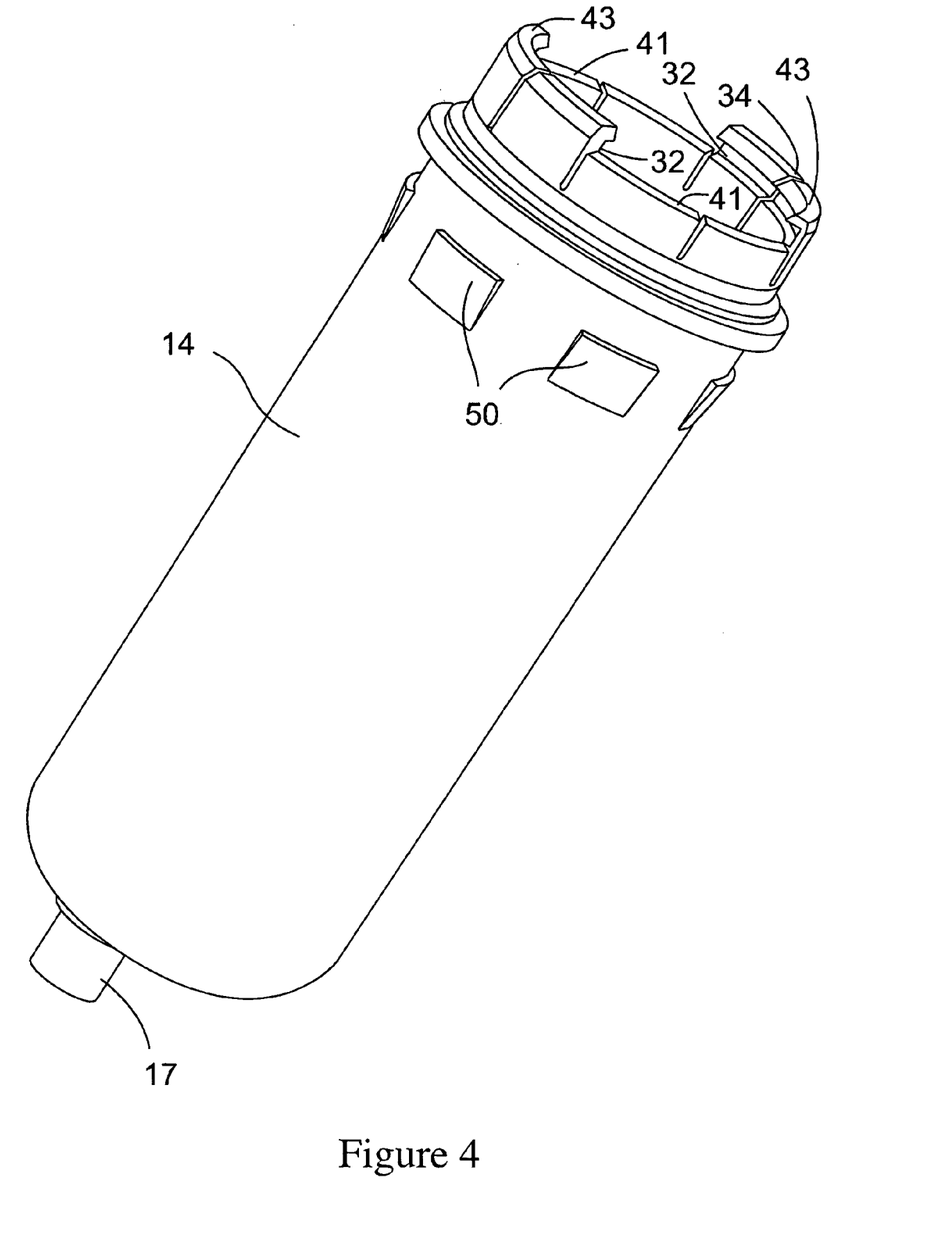
FIG. 4 is an isometric view illustrating a bowl and collar of this invention.

Referring to FIG. 4, a bowl and collar construction of this invention is shown. The collar 34 is threaded into the bowl 14. Alternatively, the collar 34 and bowl 14 can be molded as one piece. The bowl 14 includes a plurality of stops 50 which support a locking ring 18 (FIG. 1). The bowl 14 includes an inlet 17 that can be open or closed.

While the end cap utilized in this invention has been described with reference to two opposing flanges, it is to be understood that the end cap can be provided with more than two flanges. At least two flanges are required in order to maintain the axial alignment of the cartridge with the bowl. The orientation and angle subtended by the flanges 15 are such as to permit their insertion into the slots 32 of collar 34.

In one aspect of this invention, the end cap having flanges is provided with an outside surface configuration which mates with an inside surface configuration of the collar attached to the bowl in order to center the filter cartridge to which it is attached within the bowl. Centering the cartridge within the bowl allows for a smooth mating of the flanges and collar when the flanges are rotated into the collar. The outside surface configuration of the flanges can include a small groove. While this outside surface configuration is not required in this invention, in its absence, the flanges will slide from side to side within the collar thereby increasing difficulty of engaging the flanges and collar.

Figure 5:
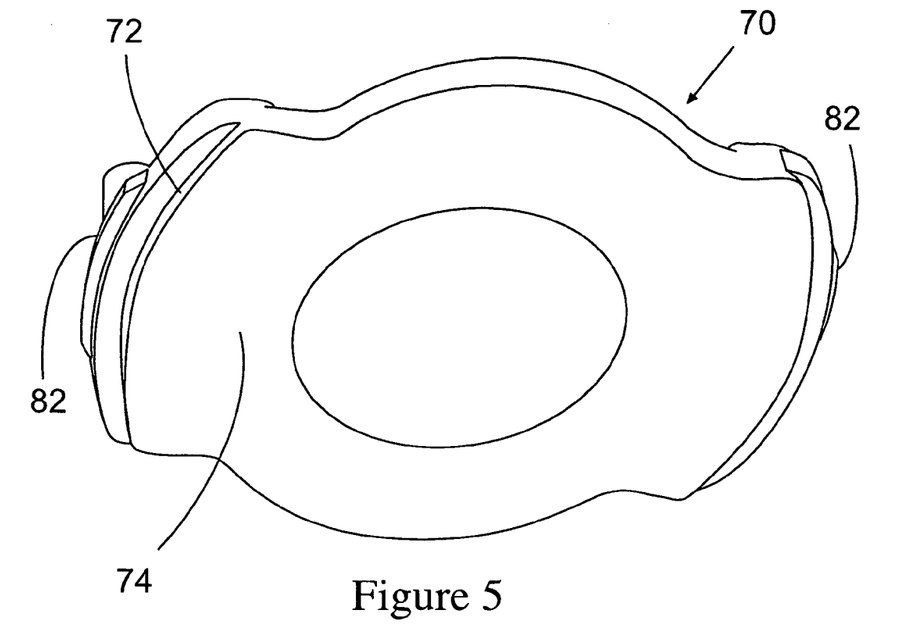
FIG. 5 is a bottom perspective view of an alternative end cap of this invention.
Figure 6:
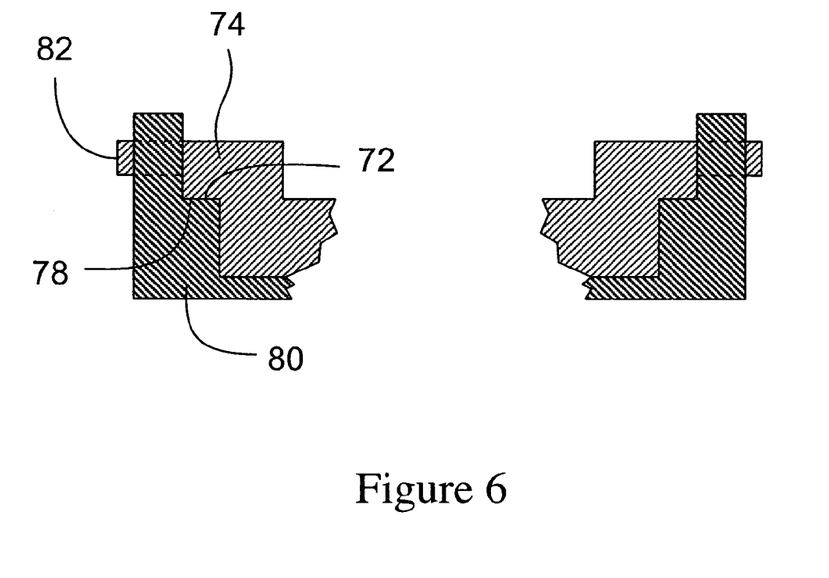
FIG. 6 is a partial cross sectional view of the position of the end cap of FIG. 5, on the collar shown in FIG. 7.

Referring to FIGS. 5 and 6, the end cap 70 includes a groove 72 on legs 74 and 76 which mates with a surface 78 of collar 80. FIG. 5 illustrates a fluid passageway 71 for fluid communication between a manifold and the interior of a cartridge. While FIGS. 8 and 9 include bosses 82, they are not necessary to the groove's 72 function. The purpose of the bosses 82 are described below.

Figure 7:
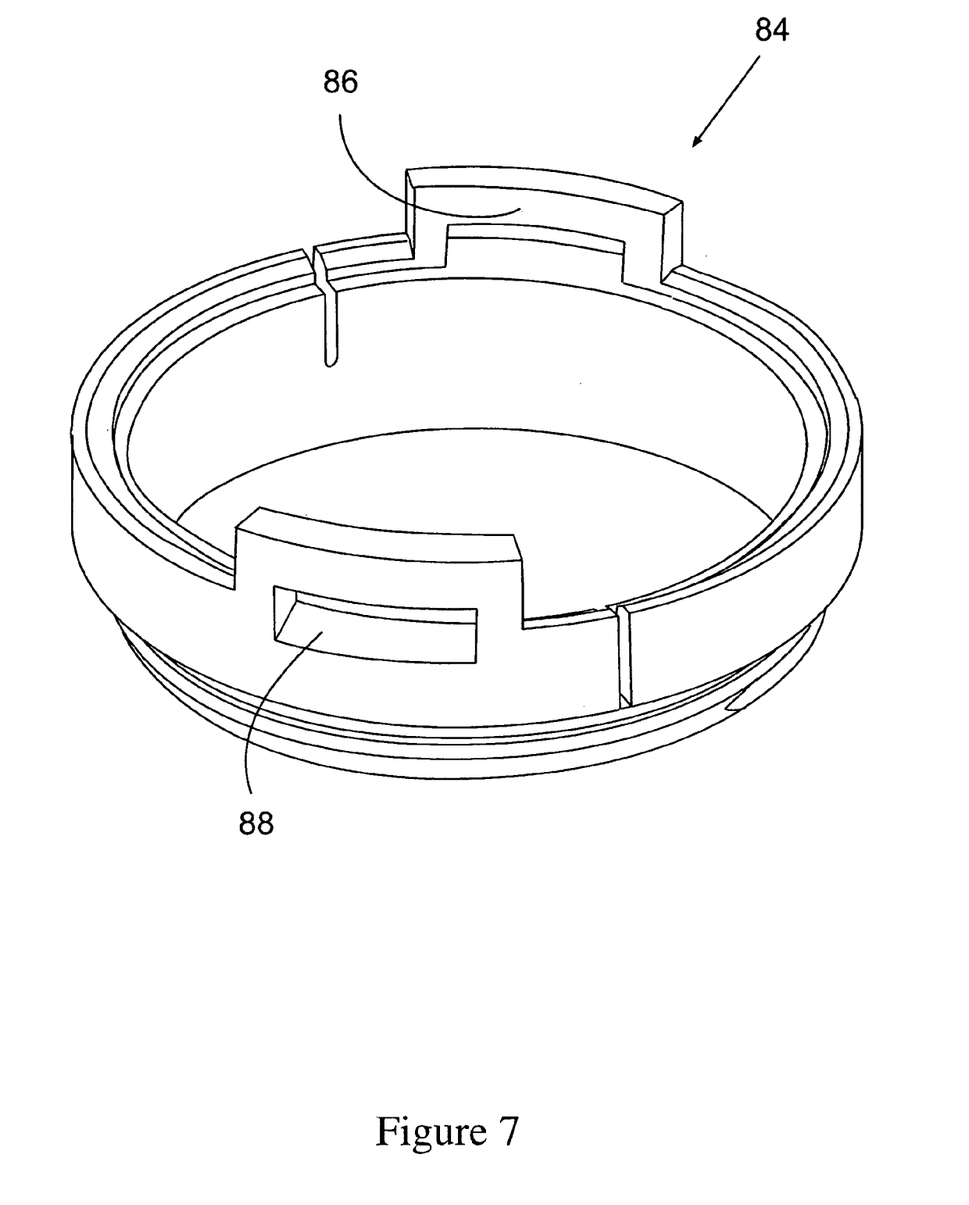
FIG. 7 is a perspective view of a collar having slots to accommodate the end cap of FIG. 5.
Figure 8:
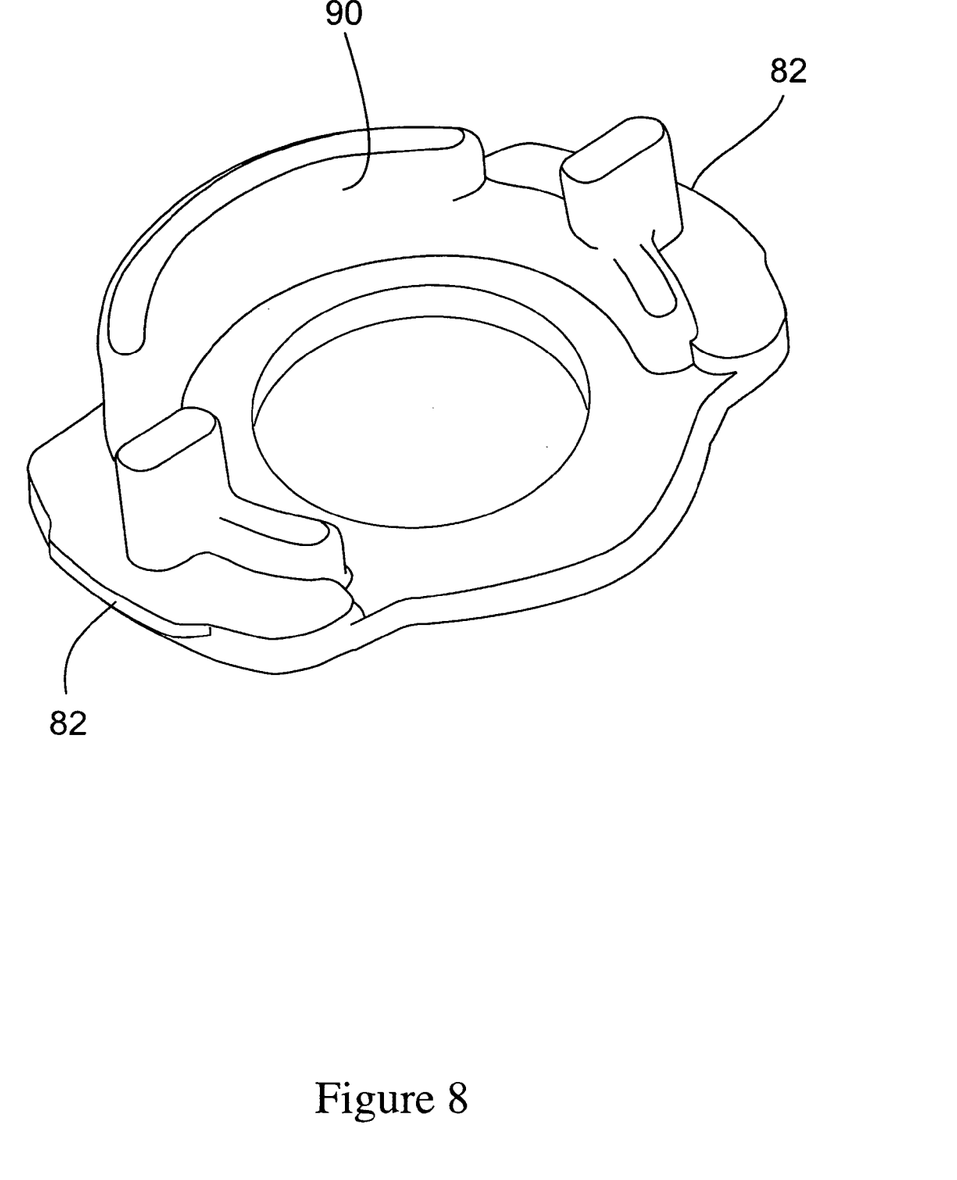
FIG. 8 is a top perspective view of an alternate end cap of this invention.
Figure 9:
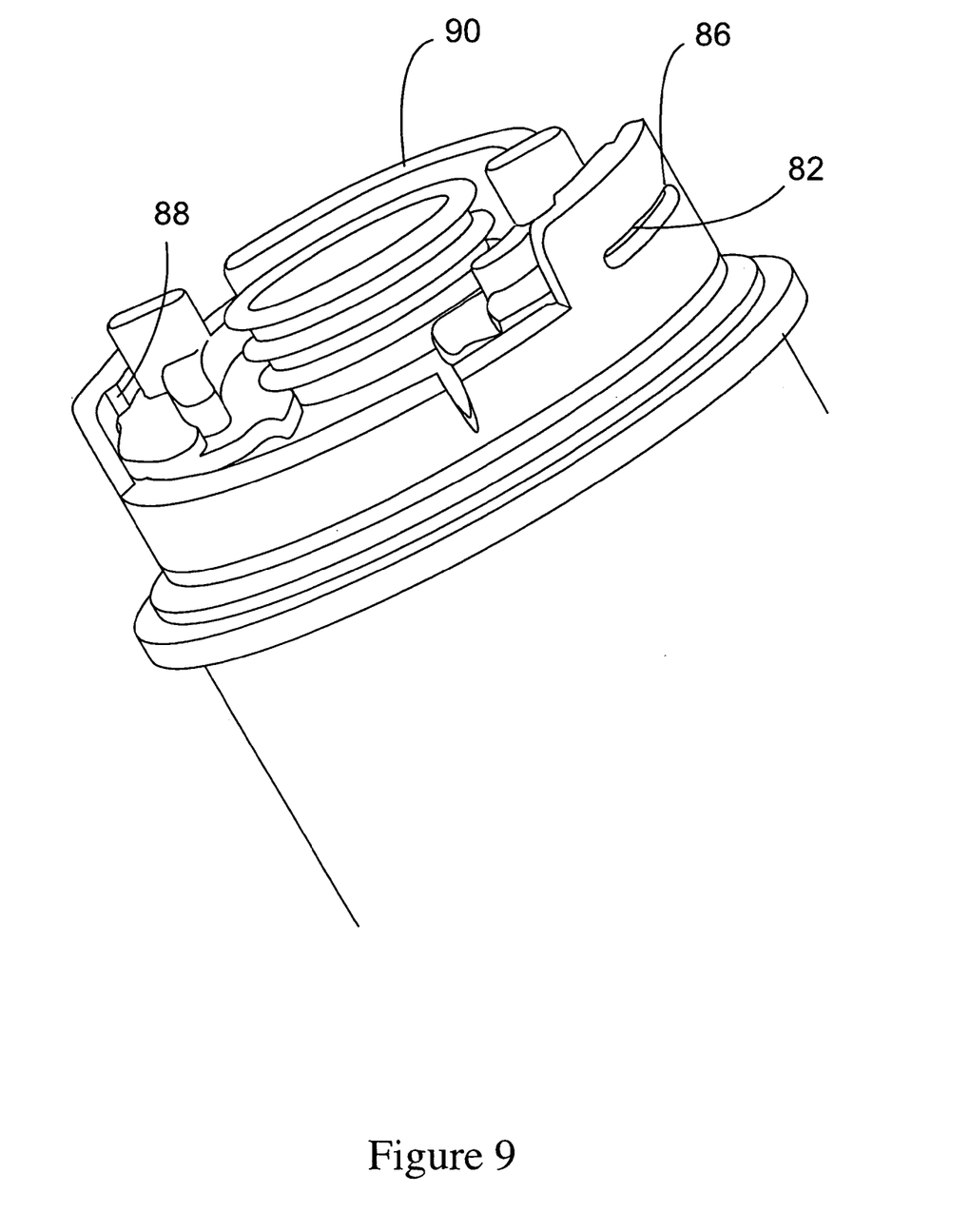
FIG. 9 is a perspective view of the end cap of FIG. 8 fitting with the collar of FIG. 7.

Referring to FIGS. 7, 8, and 9, the collar 84 includes two opposing slots 86 and 88 into which fit the bosses 82 when the end cap 90 is rotated into position into collar 84. Expansion of the slots away from each other is caused by contacting the bosses 82 with the inside surfaces 85 of the collar 84. The distance between the outside surfaces of the bosses 82 is slightly larger than the distance between opposing inside surfaces 85 of the collar 84. The slots 86 and 88 extend through the thickness of the collar 88. The slots 86 and 88 mate with bosses 82 on the end caps 90 to provide an improved fit between the collar 84 and the end cap 90. The bosses are configured to cause portions of the collar 84 including mating slots 86 and 88 to expand outwardly when the end cap 90 is rotated into position until the bosses 82 fit into the open slots 86 and 88. At the point of fitting, the opposing inside surfaces 85 of the collar 84 contract toward each other and portions of the collar 84 thus overlap with the bosses 82 rendering it more difficult for the end cap 90 to become detached from the collar 84 during use. The collar 84 illustrates an inside surface configuration 87 that can mate with an outside surface configuration of end cap flanges.

Figure 10:
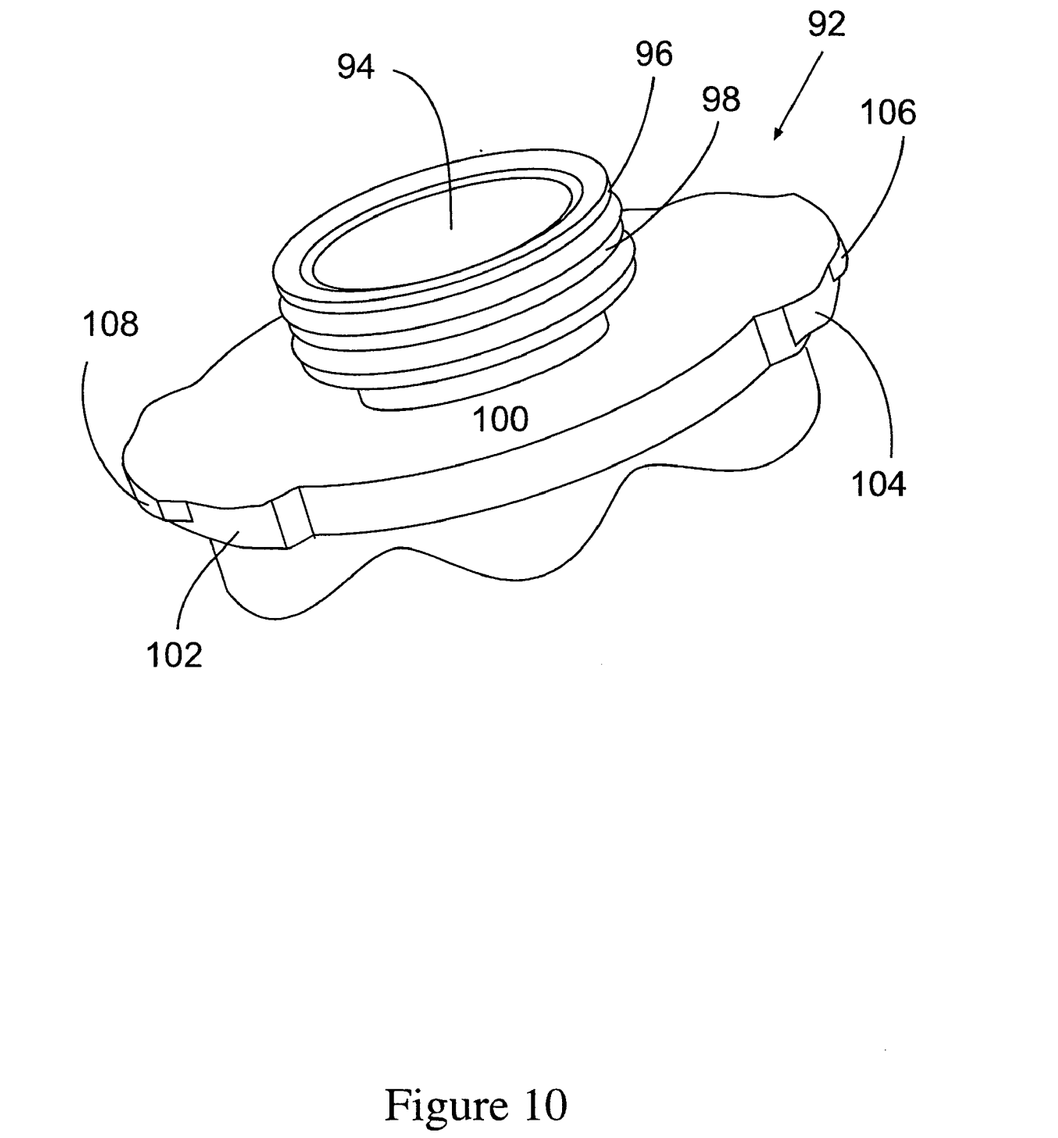
FIG. 10 is a perspective view of an end cap of this invention.

Referring to FIG. 10, an end cap 92 of this invention comprises a fluid passageway 94 having O-rings 96 and 98. The end cap 92 includes a plate 100 having flanges 102 and 104 with grooves 112 and 114 respectively on a lower surface adjacent the filter medium of each of the flanges, the grooves shaped to mate with an inner surface configuration of said collar attached to said bowl. The flanges 102 and 104 fit into slots of a housing such as slots 86 shown in FIG. 9. The flanges 102 and 104 also are provided with bosses 106 and 108 on an outside surface of the flanges 104 and 102 respectively which promote securing the end cap 92 to the collar. The end cap 92 is secured, such as by bonding to an end of a filter cartridge such as illustrated in FIG. 2.

Figure 11:
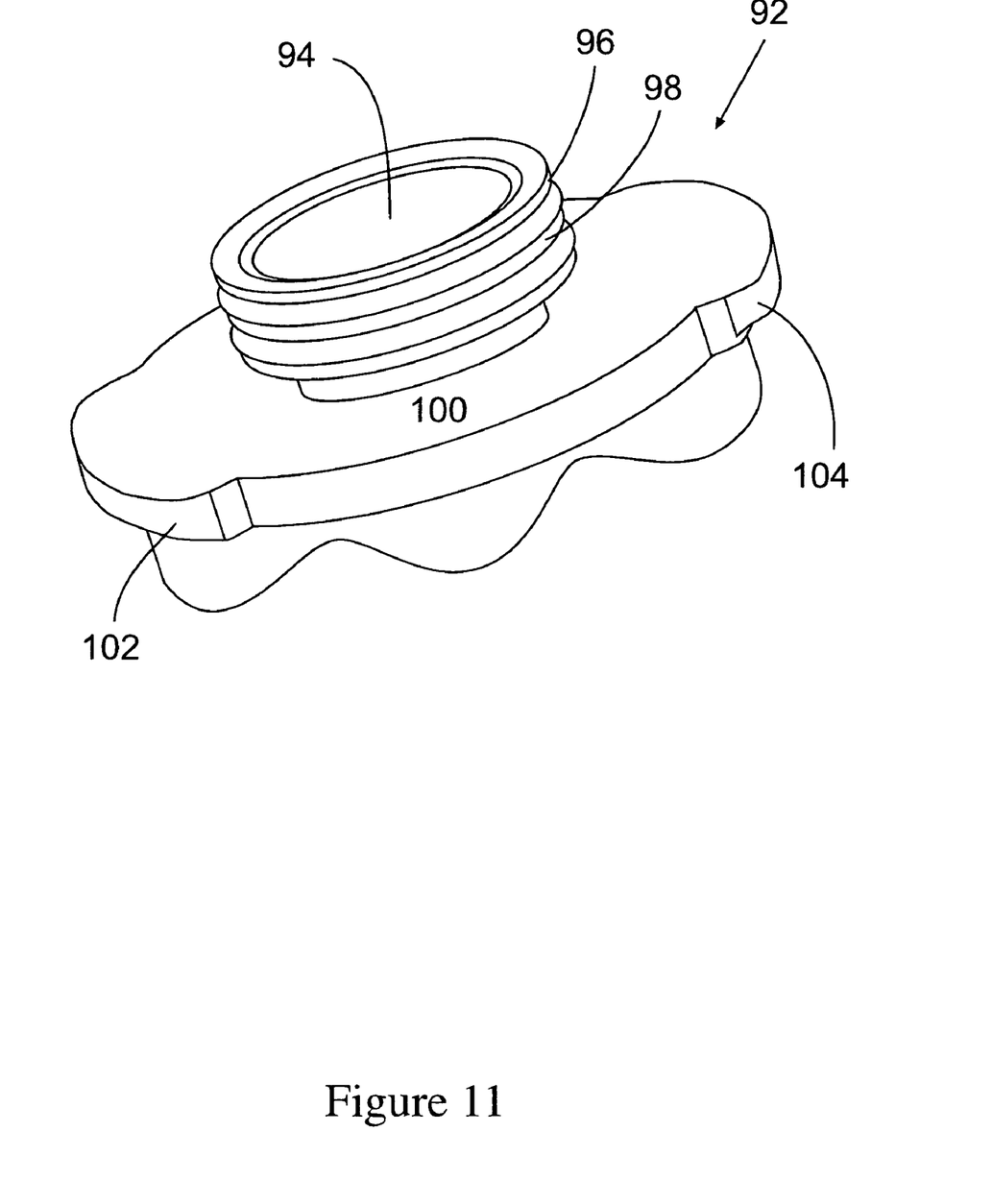
FIG. 11 is a perspective view of an alternative end cap of this invention.

Referring to FIG. 11, an alternative end cap 110 of this invention is shown. The end cap 110 does not include the bosses of the end cap of FIG. 10. The end cap 110 includes a plate 100, flanges 102 and 104 with grooves 116 and 118 respectively on a lower surface adjacent the filter medium of each of the flanges, the groove shaped to mate with an inner surface configuration of said collar attached to said bowl, a fluid passageway 94 and O-rings 96 and 98. The flanges 102 and 104 fit into slots of a collar of a bowl such as shown in FIG. 9.

The invention claimed is:

1. A mass transfer or energy transfer cart-ridge module which comprises:

a manifold having an inlet and an outlet;

a bowl having an inlet, an outlet, and a collar with slots, said slots extend through the thickness of the collar;

a cartridge comprising an elongated medium capable of effecting mass transfer therethrough or for effecting energy transfer from a first fluid to a second fluid, said elongated medium having a first end and a second end, a ring positioned on an outside surface of said bowl, said ring drives said cartridge into affirmative contact with said manifold;

a first end cap sealed to said elongated medium first end, said first end cap having a fluid passageway for fluid communication with an open interior of the cartridge and the manifold outlet, said first end cap having at least two flanges which extend beyond an outer surface of said elongated medium, said flanges extending outward from an outer vertical surface of said elongated medium and a boss on an outer surface of each of said flanges, a distance between outside surface of the bosses larger than the distance between opposing inside surfaces of the collar, the bosses configured to cause slots on the collar to expand outward when the end cap is rotated until the bosses fit into the slots of the collar; and a second end cap sealed to said elongated medium second end, said second end cap has a fluid passageway having a fluid passage for communication with the open interior of the cartridge and the bowl inlet, whereby in said module a first fluid can be introduced through the bowl inlet into said elongated medium and then out of the manifold outlet and a second fluid can be introduced through a manifold inlet onto outside surfaces of said elongated medium and then through the bowl outlet.

2. The cartridge of claim 1 wherein said medium is a pleated membrane.

3. The cartridge of claim 1 wherein said medium comprises a plurality of porous hollow fibers.

4. The cartridge of claim 1 wherein said medium comprises a plurality of nonporous hollow fibers formed of a heat conducting material.

5. A module which comprises:

a manifold having an inlet and an outlet;

a bowl which houses a cartridge of an elongated medium of a pleated membrane for effecting mass transfer from a first fluid to a second fluid, said cartridge of an elongated medium is connected to a collar on said bowl by flanges on said cartridge, said bowl having an inlet and an outlet;

a ring that locks the bowl to the manifold, the ring seals the cartridge of an elongated medium with the manifold;

the cartridge of elongated medium has a first end and a second end, a first end cap sealed to the first end of elongated medium, the first end cap has a fluid passageway for fluid communication with an open interior of the cartridge and the manifold outlet, the first end cap having at least two said flanges which extend beyond an outer surface of the elongated medium, each of the flanges includes a groove and a boss, the groove mates with an inner surface configuration of the collar on the bowl that houses the cartridge, the distance between the outside surfaces of the bosses is larger than a distance between opposing inside surfaces of the collar on the bowl;

the cartridge has a second end cap sealed to the second end of the elongated medium, said second end cap has a fluid passageway having a fluid passage for fluid communication with the open of the cartridge and the bowl inlet, whereby the first fluid can be introduced through a bowl inlet into said cartridge of an elongated medium and then out of said cartridge of an elongated medium through a manifold outlet, and said second fluid can be introduced through a manifold inlet onto outside surfaces of said cartridge of elongated medium and then through a bowl outlet;

the collar includes two opposing slots which fit the bosses when the first end cap of the cartridge of elongated medium is rotated into position, the slots extend through the thickness of the collar, the slots mate with the bosses on the end cap, the bosses are configured to cause inner surfaces on the collar to expand outwardly when the end cap is rotated into position until the bosses fit into the opposing slots; at the point of fitting, the inner slot surfaces contract toward each other and thus overlap the bosses.

* * * * *